US010111550B2

(12) United States Patent
Fairchild et al.

(10) Patent No.: US 10,111,550 B2
(45) Date of Patent: Oct. 30, 2018

(54) STICK-ON HANGERS FOR BARRIER ASSEMBLY

(71) Applicants: Troy T Fairchild, Overland Park, KS (US); Timothy R Anderson, Olathe, KS (US)

(72) Inventors: Troy T Fairchild, Overland Park, KS (US); Timothy R Anderson, Olathe, KS (US)

(*) Notice: Subject to any disclaimer, the term of this patent is extended or adjusted under 35 U.S.C. 154(b) by 0 days.

(21) Appl. No.: 15/864,225

(22) Filed: Jan. 8, 2018

(65) Prior Publication Data

US 2018/0125279 A1    May 10, 2018

Related U.S. Application Data

(63) Continuation-in-part of application No. 15/044,472, filed on Feb. 16, 2016, now Pat. No. 9,863,555.

(51) Int. Cl.
| | |
|---|---|
| *A47G 1/18* | (2006.01) |
| *A47H 1/18* | (2006.01) |
| *A47G 1/17* | (2006.01) |
| *F16B 47/00* | (2006.01) |
| *A47H 13/00* | (2006.01) |

(52) U.S. Cl.
CPC ............. *A47H 1/18* (2013.01); *A47G 1/17* (2013.01); *A47H 13/00* (2013.01); *F16B 47/003* (2013.01)

(58) Field of Classification Search
USPC ........ 248/683, 693, 317, 309.1, 467, 49, 53, 248/58, 60, 61, 62, 63; 160/389, 400, 160/330, 348, 84, 382
See application file for complete search history.

(56) References Cited

U.S. PATENT DOCUMENTS

| | | | |
|---|---|---|---|
| 1,687,859 A * | 10/1928 | Fontaine | B42F 15/06 |
| | | | 206/806 |
| 4,962,757 A | 10/1990 | Stefan | |
| 5,147,322 A | 9/1992 | Bowen et al. | |
| 5,304,146 A | 4/1994 | Johnson et al. | |
| 6,769,541 B1 | 8/2004 | Carriere | |
| 6,994,307 B2 | 2/2006 | Curtsinger | |
| 7,762,398 B2 | 7/2010 | Tokie et al. | |
| 9,863,555 B2 * | 1/2018 | Fairchild | F16L 3/14 |
| 2002/0100856 A1 * | 8/2002 | Hatton | B42F 15/066 |
| | | | 248/683 |
| 2003/0170399 A1 | 9/2003 | Owed | |
| 2006/0006300 A1 | 1/2006 | Reason | |
| 2013/0043156 A1 | 2/2013 | Glass | |

* cited by examiner

*Primary Examiner* — Alfred J Wujciak
(74) *Attorney, Agent, or Firm* — Erickson Kernell IP, LLC; John C. McMahon

(57) ABSTRACT

A barrier assembly for blocking a potentially debris-carrying airflow includes an elongated, flexible barrier sheet extending from a ceiling to a floor and a plurality of hanger structures engaging an upper edge of the sheet in longitudinally spaced relation therealong. Each hanger structure includes a connector tab adapted for engagement with a suspension member and a pair of diverging adhesive panels for adhesive engagement with the sheet. The suspension members engage ceiling members to support the sheet from the ceiling.

24 Claims, 4 Drawing Sheets

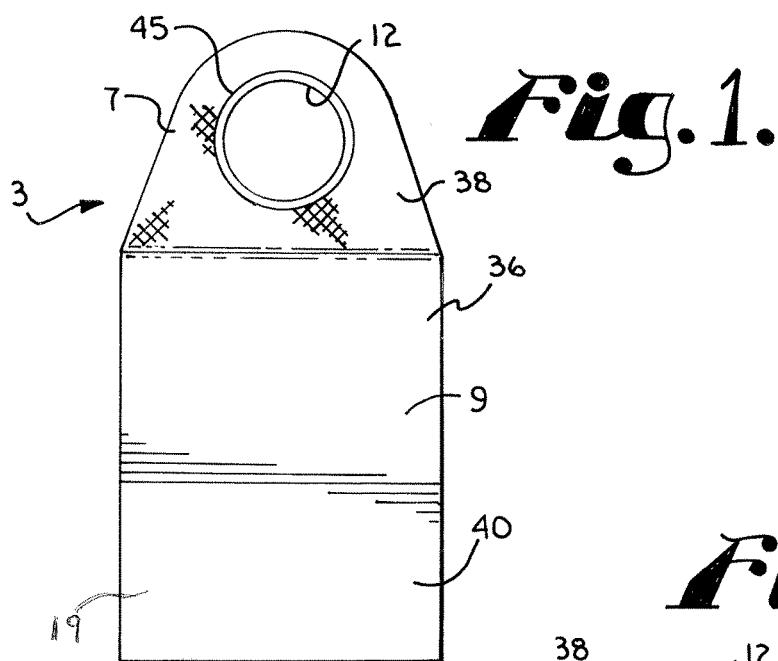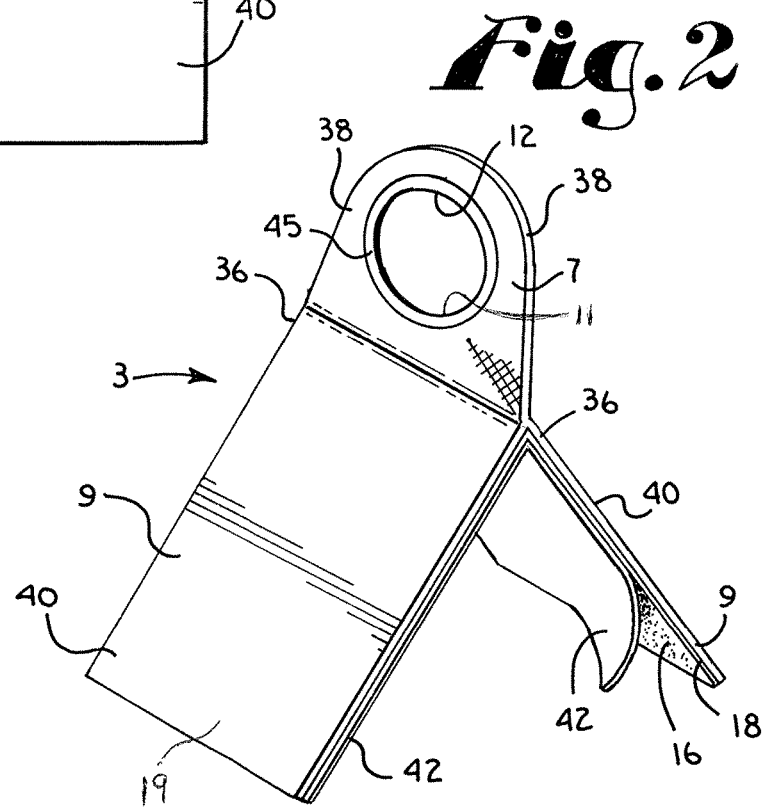

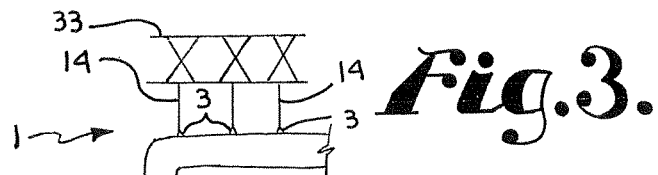
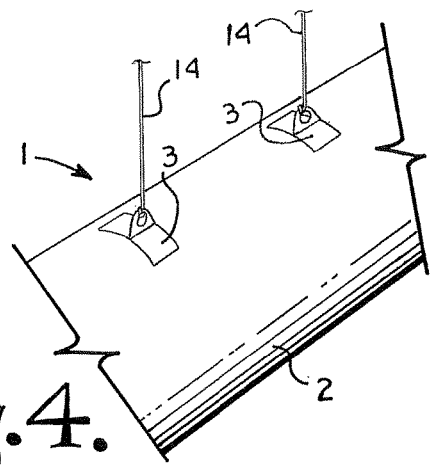
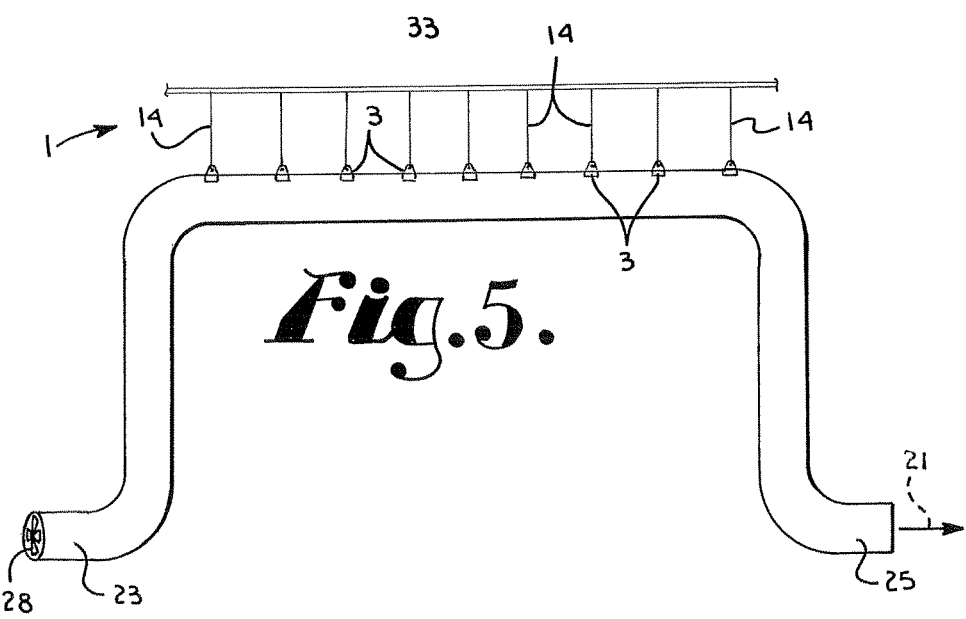

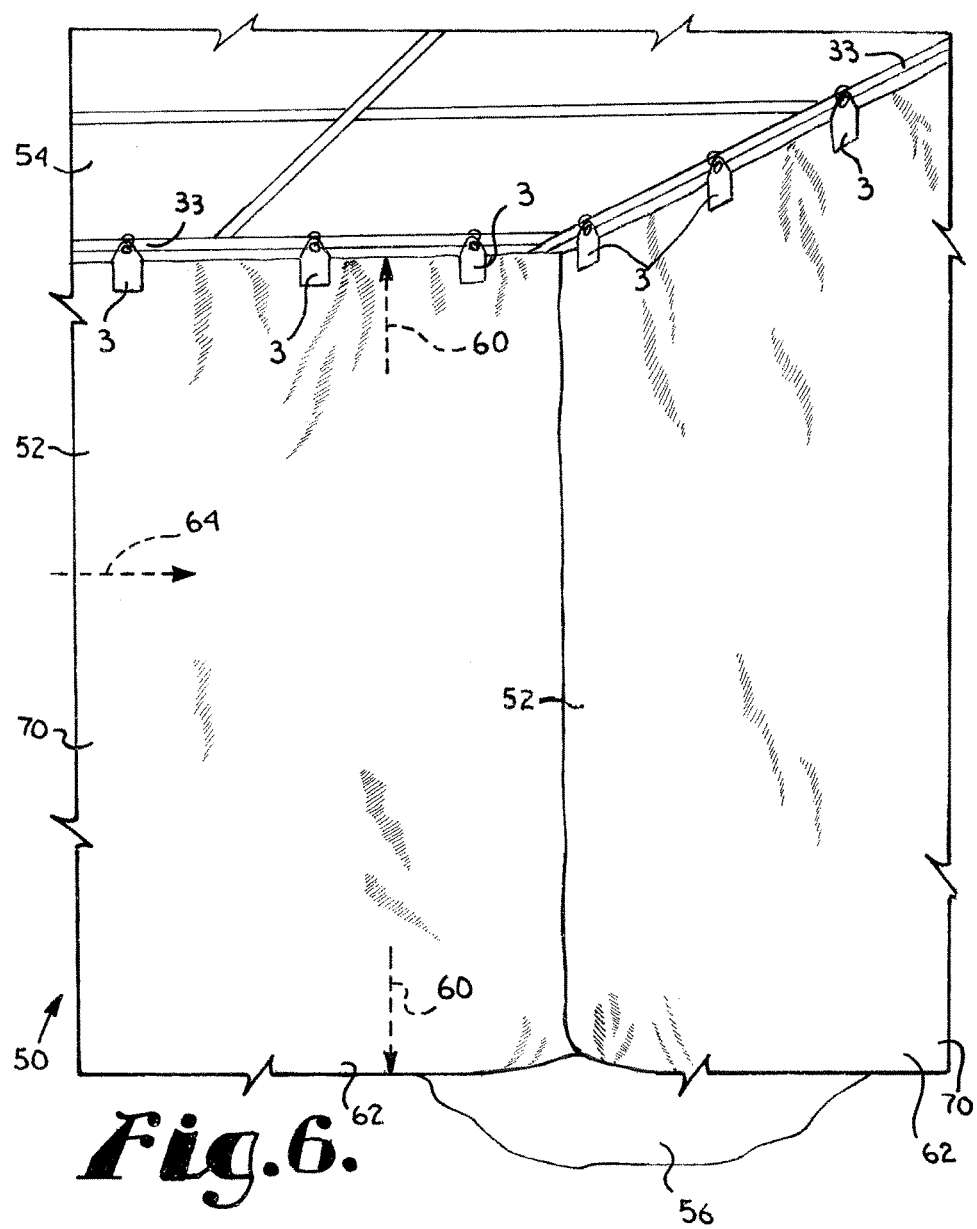

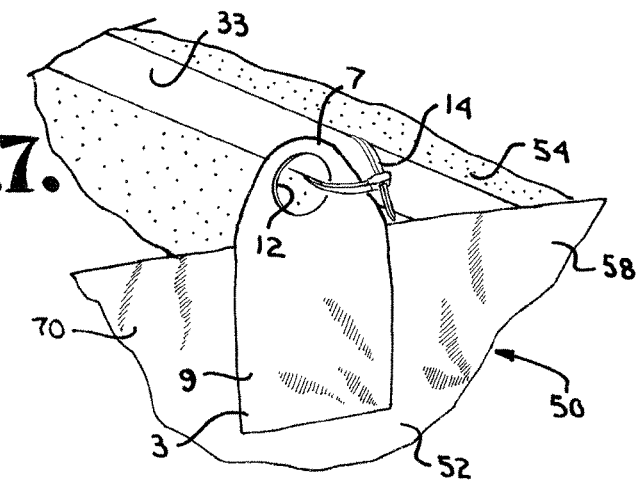
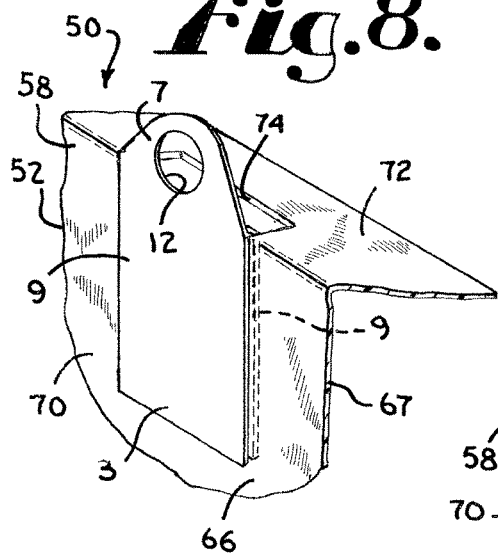
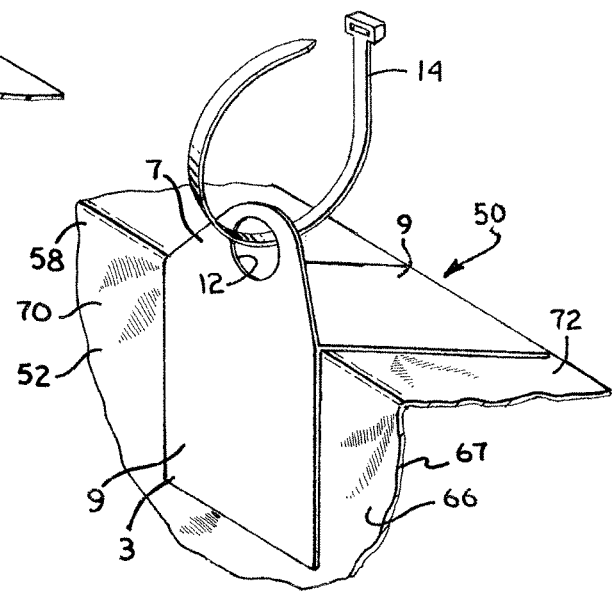

STICK-ON HANGERS FOR BARRIER ASSEMBLY

CROSS-REFERENCE TO RELATED APPLICATION

This is a Continuation-in-Part of U.S. patent application Ser. No. 15/044,472 which was filed on Feb. 16, 2016, for STICK ON HANGERS FOR LAYFLAT DUCTING SYSTEM, the disclosure of which is incorporated in its entirety herein by reference.

BACKGROUND OF THE INVENTION

The present invention is broadly concerned with improvements in equipment for quickly drying previously flooded areas of a building and, more particularly, to hanger structures for supporting temporary ducting for such activity.

When an area of a building such as a commercial building is flooded, as by spillage, a ruptured water pipe, a roof leak, the application of water for fire suppression, or the like, it is necessary to quickly drain and dry such an area to avoid further damage from standing water, corrosion, fungal growth, and the like.

A common technique for drying such an area is to direct a drying airflow toward the wet area by means of temporary ducting suspended from ceiling supports and extending from a fan/heater unit to the area to be dried. The fan unit may be placed outdoors. The ducting may have branches to direct the drying airflow to multiple areas. Typically, the ducting is supported by lengths of wire or rope or other structures connected to existing ceiling trusses or beams. The wire or rope sections are secured to the ducting by common duct tape. The type of ducting structure used is known as "layflat" tubing material.

Layflat tubing, also known as lay flat tubing or LFT, is a continuous length of a seamless, tubular, flexible, polymer film which is manufactured by the packaging industry and which is usually provided in a continuous flat form on rolls. Because of its flexibility, it is referred to as layflat tubing. One of the most common uses of layflat tubing is in heat sealed packaging, as for foods and other products. The use of duct tape to install the temporary ducting is time consuming and laborious, such that the application of a drying airflow to the wet area is delayed.

Such layflat tubing can also be used to exhaust dust and particulates from an area of a building undergoing remodeling construction, spray painting, cleanup after construction, and the like. In addition to exhausting such airborne materials, temporary barriers can be erected to block movement of potentially debris-carrying airflows from one area to another. Such barriers can be formed by elongated polymer sheets extending from a ceiling or ceiling structure to a floor therebelow. As with layflat ducting, the use of duct tape to install such temporary barrier sheets may be time consuming and laborious.

SUMMARY OF THE INVENTION

The present invention provides embodiments of an improved apparatus for drying a wet area of a building using hanger structures according to the present invention. The drying apparatus generally includes an elongated flexible duct or ducting member supported by suspension members from ceiling members. The suspension members are engaged with the ducting member by a plurality of spaced apart hanger structures.

An embodiment of the hanger structure for supporting the ducting member from a suspension member includes: a connector tab adapted for engagement with a suspension member; a pair of flexible adhesive panels extending from the connector tab, the panels having respective inner surfaces and outer surfaces; each of the adhesive panels having an adhesive on a respective inner surface thereof; and the panels being angularly separable to enable adhesive engagement of the inner surfaces thereof with a ducting member.

In an embodiment of the present invention, the hanger structure is formed by a pair of layers, each layer having a tab end and a panel end. The tab ends of the layers are joined to form the connector tab. The panel ends of the layers form the adhesive panels, and the adhesive panels are angularly flexible relative to the connector tab. Inner surfaces of the adhesive panels may have respective release sheets removably positioned thereon which are removed prior to adhesively engaging the panels to the ducting member.

The connector tab may include an opening formed therethrough to facilitate engagement of a suspension member therewith. The opening may simply be an aperture formed through the connector tab or may, alternatively be of a shape which forms the connector tab into a hook. An edge forming the opening may be reinforced, as by thickening of material about the opening or by shaping of material forming the tab in such a manner as to reinforce the edge of the opening. Alternatively, the opening of the connector tab may have a grommet positioned therein for reinforcement thereof.

An embodiment of the present invention includes the combination of an elongated flexible ducting member and one or more hanger structures to engage corresponding suspension members and including: a connector tab adapted for engagement with a suspension member; a pair of flexible adhesive panels extending from the connector tab, the panels having respective inner surfaces and outer surfaces; each of the adhesive panels having an adhesive on a respective inner surface thereof; and the panels being angularly separable to enable adhesive engagement of the inner surfaces thereof with a ducting member. A plurality of the hanger structures may have the adhesive panels thereof adhesively engaged with the ducting member at spaced apart locations therealong.

The hanger structure according to the present invention may be formed from a material such as a polymer film which may be recycled or which is biodegradable. Similarly, the flexible ducting member may be formed from a recyclable or biodegradable polymer film. It is also foreseen that the hanger structure could be formed of a type of paper or of a laminate of a paper and a polymer film.

An embodiment of the present invention includes a method for drying a wet area of a building having ceiling members and comprising the steps of: extending an elongated flexible ducting member from a source of drying air to a wet area of a building, the ducting member having a source end at a source of drying air and an exit end at a wet area of a building; suspending a plurality of suspension members from ceiling members at spaced locations along the ducting member; adhesively engaging a plurality of hanger structures to the ducting member at longitudinally spaced locations thereof, each hanger structure including: a connector tab adapted for engagement with a suspension member; a pair of flexible adhesive panels extending from the connector tab, the panels having respective inner surfaces and outer surfaces; each of the adhesive panels having an adhesive on a respective inner surface thereof; and the panels being angularly separable to enable adhesive engagement of the inner surfaces thereof with a ducting member; engaging the connector tab of each hanger structure with a respective suspension member to support a portion of the ducting member from the ceiling members; forcing air into the ducting member at the source end thereof; and directing the exit end of the duct toward a wet area to apply air thereto to dry such a wet area.

The present invention is also directed to embodiments of a barrier assembly for blocking movement of a potentially debris-carrying airflow in a building structure. An embodiment of such a barrier assembly comprises an elongated flexible barrier sheet having an upper edge and a lower edge and having a drape height to extend from a ceiling to a floor therebelow; one or more connector tabs, each tab having an opening therethrough to receive a suspension member for connection of the barrier sheet to a ceiling; the tab including a pair of flexible adhesive panels extending from the connector tab, the panels having respective inner surfaces; each of the adhesive panels having an adhesive on a respective inner surface thereof; and the panels being angularly separable to enable adhesive engagement of the inner surfaces thereof with the barrier sheet to support the barrier sheet between the ceiling and the floor.

The connector tab may be engaged with a suspension member to connect the barrier sheet to the ceiling. A plurality of the connector tabs may be adhesively engaged with the barrier sheet in longitudinally spaced relation adjacent the upper edge of the barrier sheet.

Each of the adhesive panels may include a release sheet removably positioned thereon, each release sheet being removable from the associated adhesive panel to enable adhering the adhesive panel to the barrier sheet. The tab may have a reinforcement structure extending about the edge forming the opening in the tab, such as a grommet. The tab may be formed of a pair of layers, each layer having a tab end and a panel end. The tab ends of the layers are joined to form the connector tab while the panel ends of the layers forming the adhesive panels. The adhesive panels may be angularly flexible relative to the connector tab.

The barrier sheet may include an elongated drape with opposite surfaces, and the panels of the tab adhesively may engage the opposite surfaces of the drape respectively. Alternatively, the barrier sheet may have an elongated flap folded over from the upper edge of the drape. In an embodiment of the barrier assembly, the panels of the tab adhesively engage the drape and the flap respectively.

In another embodiment of the barrier assembly, the flap has an opening formed therethrough adjacent the upper edge of the drape, and the panels of the tab adhesively engage the opposite surfaces of drape respectively, with one of the panels engaging a surface of the drape through the opening of the flap.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 1 is a side elevational view of a stick-on hanger structure according to the present invention.

FIG. 2 is a perspective view of the hanger structure with adhesive panels shown in an angularly spread condition.

FIG. 3 is a diagrammatic perspective view at a reduced scale of a layflat ducting member supported from a building ceiling structure by suspension members connected to the ducting member by hanger structures according to the present invention.

FIG. 4 is a an enlarged fragmentary perspective view of the layflat ducting member supported by a pair of hanger structures of the present invention.

FIG. 5 is a diagrammatic side elevational view of the layflat ducting member supported from a building ceiling by suspension members connected to the ducting member by hanger structures of the present invention.

FIG. 6 is a fragmentary perspective view of an embodiment of a barrier assembly according to the present invention including a plurality of connector tabs temporarily connecting a barrier sheet to a ceiling structure.

FIG. 7 is a fragmentary perspective view of a connector tab having panels thereof adhesively engaged with opposite surfaces of the barrier sheet.

FIG. 8 is a fragmentary perspective view of a connector tab having panels thereof adhesively engaged with opposite surfaces of a drape of the barrier sheet with one of the panels extending through an opening formed in an upper flap of the barrier sheet.

FIG. 9 is a view similar to FIG. 8 and shows the panels adhesively engaged respectively with the drape and the flap of the barrier sheet.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of an improved drying system for drying a wet area of a building. The system 1 generally includes an elongated flexible ducting member 2 (FIGS. 3-5) and a plurality of hanger structures or hangers 3 which cooperate to conduct drying air to the area to be dried.

Referring to FIGS. 1 and 2, an embodiment of the hanger structure 3 includes a hanger body or connector tab 7 with a pair of adhesive panels 9 diverging therefrom. The connector tab 7 has an edge 11 forming an opening 12 through the connector tab to enable engagement or connection with a suspension member 14 (FIGS. 3-5) as will be detailed further below. Each of the adhesive panels 9 has an inner surface 18 and an outer surface 19 with an adhesive material or adhesive 16 applied to inner surface 18 thereof. In general, the adhesive panels 9 are spread apart and the inner surfaces 18 thereof are adhesively engaged with an outer surface of the ducting member 2 to enable the ducting member 2 to be supported by the suspension members 14.

The ducting member or duct 2 is an elongated flexible tubular member which is employed to transfer a stream 21 (FIG. 5) of drying air from an air source end 23 of the duct 2 to an exit end 25 thereof. The source end 23 of the duct 2 is positioned in communication with an air source 28, such as a fan, and extended to a wet area to be dried by the air stream 21 issuing from the exit end 25 of the duct 2. The air source 28 may be placed outside of the building 31 in which the wet area is located or, alternatively, at a dry area of the building 31. The air source or fan 28 may be a heavy duty fan which is portable or which is mounted on a structure (not shown) which can be moved, as by a forklift.

The duct 2 is supported from the source end 23 to the exit end 25 by the suspension members 14 which may be connected to ceiling structural members 33 of the building 31, such as trusses, beams, or the like. The suspension members 14 may be elements such as ropes, wires, bungee cords, or the like which are engaged with the openings 12 of the connector tabs of the hanger structures 3 to support the duct 2.

The ducting member 2 is preferably an elongated light weight, flexible tubular member and may be a product referred to generally as "layflat" or lay flat tubing. The term refers to a continuous, seamless, tubular polymer tubing which is typically supplied in rolls. Layflat tubing is often used in heat sealed packaging of products. The pressure of air from the source 28 inflates the duct 2. Therefore, ducting member 2 is formed of a material which can withstand the pressure of air moving therethrough without rupturing. The ducting member 2 may be formed of a material which is capable of being recycled or which is biodegradable. Although the duct 2 is illustrated as a single run of ducting, it is foreseen that additional runs of ducting may be joined or spliced into a trunk duct 2 to enable drying multiple areas. Junctions of such branch ducts (not shown) may be made by cutting into the duct 2 and joining additional ducts, as by the use of tape.

The illustrated hanger structure 3 is formed by a pair of hanger layers 36, each layer including a tab end 38 and a panel end 40. The tab ends 38 are joined to form the connector tab 7, as by an adhesive, by heat lamination, or the like. Each of the panel ends 40 forms an adhesive panel 9 and has the adhesive 16 applied to the inner surface 18 thereof. As illustrated, each inner surface 18 has a release sheet 42 positioned on the adhesive surface to prevent the panels 9 from sticking together. The release sheets 42 are removed from the panels 9 prior to adhering them to the ducting member 2. The release sheets 42 may be individual sheets. However, it is foreseen that the release sheets 42 may be joined at an end near the connector tab 7 to form a single release sheet 42.

On the illustrated connector tab 7, the opening 12 is shown as a circular aperture. It is also foreseen that the opening 12 could, alternatively, could have a shape as to give the connector tab 7 the form of a hook (not shown). The edge forming the opening 12 may be provided with a reinforcement 45 to resist excessive deformation or tearing of the connector tab 7. The reinforcement 45 may be in the formed of a thickening of the tab layer 38 about the opening 12 or by molding the tab layer 38, as during lamination of the tab layers 38, to provide a radial shape which strengthens the tab 7 about the opening 12. The reinforcement 45 may also be provided in the form of a grommet which is inserted within the opening 12 about the edge thereof.

The layers 36 of the hanger structure 3 may be formed of a type of paper or of a polymer film such as vinyl, polyvinyl chloride, polyurethane, or the like. It is also foreseen that layers 36 may be formed reinforced by a fabric, by fibers, or by paper or foil layers which are laminated therewith.

Referring to FIGS. 6-9, embodiments of a temporary barrier assembly 50 are illustrated. The illustrated assembly 50 generally includes an elongated barrier sheet 52 supported from a ceiling structure or ceiling 54 to a floor 56 therebelow by a plurality of the hanger structures 3 (FIGS. 1 and 2) positioned in longitudinally spaced relation along an upper edge or edge region 58 of the sheet 52. Preferably, the barrier sheet 52 has a barrier height (indicated by arrows 60 in FIG. 6) such that the upper edge 58 of the sheet 52 engages the ceiling 54 and a lower edge 62 of the sheet engages the floor 56 to substantially block movement of potentially debris-bearing or debris-laden airflows (indicated by arrow 64 in FIG. 6) to reduce the ingress of such debris into particular areas of a building 31 (FIG. 3). The barrier sheet 52 may be formed of a material similar to the materials forming the ducting member 3 described above.

The illustrated barrier sheet 52 has opposite surfaces 66 and 67 (FIGS. 8 and 9). The sheet 52 is supported from ceiling structure such as trusses 33 by a plurality of hanger structures 3 engaging the upper edge 58 of the sheet 52 at longitudinally spaced locations along the upper edge 58. The adhesive panels 9 of the hangers 3 may respectively engage the opposite surfaces 66 and 67. A suspension member 14, such as a cable tie or the like, may be passed through the openings 12 of the connector tabs 7 of the hangers 3 and removably engaged with ceiling trusses 33.

Embodiments of the barrier sheet 52 may be formed of a depending drape section or drape 70 (FIGS. 8 and 9) and a flap section or flap 72 folded over from the drape 70 at an upper edge region 58 of the barrier sheet. The flap 72 may have a tendency to angle upwardly whereby it engages the ceiling 54 and provides a seal at the upper region 58 of the sheet 52 against potentially debris-laden airflows 64. Preferably, the drape 70 has a drape height 60 sufficient that the lower edge 62 of the sheet engages the floor 56 to seal against the floor and thereby prevent the passage of debris-laden airflows 64 therepast.

In an embodiment of the barrier assembly 50 illustrated in FIG. 9, the hanger structures 3 support the sheet 52 by adhesive engagement of the adhesive panels 9 respectively with the flap 72 and the drape 70. In an embodiment of the assembly 50 shown in FIG. 8, the hanger structure 3 has an opening 74 in the flap 72 at each location on the sheet 52 to receive a hanger structure 3. The opening 74 enables the one adhesive panels 9 of a hanger 3 to extend therethrough for adhesive engagement with one of the surfaces 67 of the drape 70. The opposite adhesive panel 9 of the hanger 3 may adhesively engage the opposite surface 66 of the drape 70. Preferably, the release sheets 42 (FIG. 2) are left on the adhesive panels 9 until they are in their respective positions on opposite surfaces 66 and 67 of the drape 70. Preferably, the barrier sheet 52 and the hangers 3 have sufficient flexibility as to enable the barrier assembly 50 to move somewhat in reaction to airflows 64 to avoid excessive stresses thereon.

When the activities generating potentially debris-carrying airflows 64 have been completed, the barrier assembly 50 may be conveniently taken down, and the components 52, 3, and 14 can be discarded or recycled, as appropriate.

It is to be understood that while certain forms of the present invention have been described and illustrated herein, it is not to be limited to the specific forms or arrangement of parts described and shown.

What is claimed and desired to be secured by Letters Patent is:

1. A barrier assembly for substantially blocking movement of a potentially debris-carrying airflow in a building structure having a ceiling and a floor and comprising:
   (a) an elongated flexible barrier sheet having an upper edge and a lower edge and having a drape height to extend from the ceiling to the floor therebelow;

(b) a connector tab having an opening therethrough to receive a suspension member for connection of the barrier sheet to the ceiling;

(c) the tab including a pair of flexible adhesive panels extending from the connector tab, the panels having respective inner surfaces;

(d) each of the adhesive panels having an adhesive on a respective inner surface thereof; and (e) the panels being angularly separable to enable adhesive engagement of the inner surfaces thereof with the barrier sheet to support the barrier sheet between the ceiling and the floor.

2. An assembly as set forth in claim 1 wherein:

(a) each of the adhesive panels has a release sheet removably positioned thereon, each release sheet being removable from the associated adhesive panel to enable adhering the adhesive panel to the barrier sheet.

3. An assembly as set forth in claim 1 wherein:

(a) a reinforcement extends about the edge forming the opening in the tab.

4. An assembly as set forth in claim 1 and including:

(a) a pair of layers, each layer having a tab end and a panel end;

(b) the tab ends of the layers being joined to form the connector tab;

(c) the panel ends of the layers forming the adhesive panels; and (d) the adhesive panels being angularly flexible relative to the connector tab.

5. An assembly as set forth in claim 1 wherein:

(a) the adhesive panels of the hanger structure are adhered to the barrier sheet; and (b) the connector tab of the hanger structure is engaged with a suspension member to connect the barrier sheet to a ceiling.

6. An assembly as set forth in claim 1 and including:

(a) a plurality of the connector tabs adhesively engaged with the barrier sheet in longitudinally spaced relation adjacent the upper edge of the barrier sheet.

7. An assembly as set forth in claim 1 wherein:

(a) the barrier sheet includes an elongated drape with opposite surfaces; and (b) the panels of the tab adhesively engage the opposite surfaces of the drape respectively.

8. An assembly as set forth in claim 1 wherein:

(a) the barrier sheet includes an elongated drape with an upper edge and an elongated flap folded over from the upper edge of the drape.

9. An assembly as set forth in claim 1 wherein:

(a) the barrier sheet includes an elongated drape with an upper edge and an elongated flap folded over from the upper edge of the drape; and (b) the panels of the tab adhesively engage the drape and the flap respectively.

10. An assembly as set forth in claim 1 wherein:

(a) the barrier sheet includes an elongated drape with an upper edge and opposite surfaces and an elongated flap folded over from the upper edge of the drape;

(b) the flap has an opening therethrough adjacent the upper edge of the drape; and (c) the panels of the tab adhesively engage the opposite surfaces of drape respectively, with one of the panels engaging a surface of the drape through the opening of the flap.

11. A barrier assembly for substantially blocking movement of a potentially debris-carrying airflow in a building structure having a ceiling and a floor and comprising:

(a) an elongated flexible barrier sheet having an upper edge and a lower edge and having a drape height to extend from the ceiling to the floor therebelow;

(b) a pair of hanger layers, each layer having a tab end and a panel end;

(c) the tab ends of the layers being joined to form a connector tab;

(d) an edge forming an opening through the connector tab to facilitate engagement of the structure with a suspension member;

(e) the panel ends of the layers forming adhesive panels extending from the connector tab, the panels being flexible and having respective inner surfaces;

(f) each of the adhesive panels having an adhesive on a respective inner surface thereof; and (g) the panels being angularly separable to enable adhesive engagement of the inner surfaces thereof with the barrier sheet to support the barrier sheet between the ceiling and the floor.

12. A structure as set forth in claim 11 and including:

(a) each of the adhesive panels having a release sheet removably positioned thereon, each release sheet being removable from the associated adhesive panel to enable adhering the adhesive panel to the barrier sheet.

13. A structure as set forth in claim 11 and including:

(a) a reinforcement extending about the edge forming the opening.

14. A structure as set forth in claim 11 and including:

(a) a grommet positioned within the opening to reinforce the edge forming the opening.

15. A structure as set forth in claim 11 wherein:

(a) the adhesive panels of the hanger structure are adhered to the barrier sheet; and (b) the connector tab of the hanger structure is engaged with a suspension member.

16. An assembly as set forth in claim 11 and including:

(a) a plurality of the connector tabs adhesively engaged with the barrier sheet in longitudinally spaced relation adjacent the upper edge of the barrier sheet.

17. An assembly as set forth in claim 11 wherein:

(a) the barrier sheet includes an elongated drape with an upper edge and an elongated flap folded over from the upper edge of the drape.

18. An assembly as set forth in claim 11 wherein:

(a) the barrier sheet includes an elongated drape with an upper edge and an elongated flap folded over from the upper edge of the drape; and (b) the panels of the tab adhesively engage the drape and the flap respectively.

19. An assembly as set forth in claim 11 wherein:

(a) the barrier sheet includes an elongated drape with an upper edge and opposite surfaces and an elongated flap folded over from the upper edge of the drape;

(b) the flap has an opening therethrough adjacent the upper edge of the drape; and (c) the panels of the tab adhesively engage the opposite surfaces of drape respectively, with one of the panels engaging a surface of the drape through the opening of the flap.

20. A barrier assembly for substantially blocking movement of a potentially debris-carrying airflow in a building structure having a ceiling and a floor and comprising:

(a) an elongated flexible barrier sheet having an upper edge and a lower edge and having a drape height to extend from the ceiling to the floor therebelow;

(b) a plurality of connector tabs engaging the barrier sheet in longitudinally spaced relation along the upper edge thereof to support the sheet from the ceiling;
each connector tab including:
(1) a pair of hanger layers, each layer having a tab end and a panel end;
(2) the tab ends of the layers being joined to form the connector tab;
(3) an edge forming an opening through the connector tab to facilitate engagement of the structure with a suspension member;
(4) a reinforcement extending about the edge forming the opening;
(5) the panel ends of the layers forming adhesive panels extending from the connector tab, the panels being flexible and having respective inner surfaces and outer surfaces;
(6) each of the adhesive panels having an adhesive on a respective inner surface thereof;
(7) each of the adhesive panels having a release sheet removably positioned thereon, each release sheet being removable from the associated adhesive panel to enable adhering the adhesive panel to the flexible barrier sheet;
(8) and
the panels being angularly separable to enable adhesive engagement of the inner surfaces thereof with the barrier sheet to support the barrier sheet between the ceiling and the floor.

21. An assembly as set forth in claim 20 wherein the reinforcement includes:
    (a) a grommet positioned within the opening to reinforce the edge forming the opening.

22. An assembly as set forth in claim 20 wherein:
    (a) the barrier sheet includes an elongated drape with an upper edge and an elongated flap folded over from the upper edge of the drape.

23. An assembly as set forth in claim 20 wherein:
    (a) the barrier sheet includes an elongated drape with an upper edge and an elongated flap folded over from the upper edge of the drape; and
    (b) the panels of the tab adhesively engage the drape and the flap respectively.

24. An assembly as set forth in claim 20 wherein:
    (a) the barrier sheet includes an elongated drape with an upper edge and opposite surfaces and an elongated flap folded over from the upper edge of the drape;
    (b) the flap has an opening therethrough adjacent the upper edge of the drape; and
    (c) the panels of the tab adhesively engage the opposite surfaces of drape respectively, with one of the panels engaging a surface of the drape through the opening of the flap.

* * * * *